United States Patent
McGuire

(10) Patent No.: US 9,403,697 B2
(45) Date of Patent: Aug. 2, 2016

(54) MANUAL HYDRODYNAMIC CAVITATION WATER TREATMENT DEVICE

(71) Applicant: Ecosphere Technologies, Inc., Stuart, FL (US)

(72) Inventor: Dennis McGuire, Stuart, FL (US)

(73) Assignee: Ecosphere Technologies, Inc., Stuart, FL (US)

(*) Notice: Subject to any disclaimer, the term of this patent is extended or adjusted under 35 U.S.C. 154(b) by 105 days.

(21) Appl. No.: 14/162,479

(22) Filed: Jan. 23, 2014

(65) Prior Publication Data

US 2014/0202942 A1     Jul. 24, 2014

Related U.S. Application Data

(60) Provisional application No. 61/755,679, filed on Jan. 23, 2013.

(51) Int. Cl.
*C02F 1/34*      (2006.01)
*C02F 1/36*      (2006.01)

(52) U.S. Cl.
CPC ...... *C02F 1/34* (2013.01); *C02F 1/36* (2013.01); *C02F 2201/009* (2013.01); *C02F 2307/02* (2013.01)

(58) Field of Classification Search
CPC ... A47J 43/1075; A47J 43/1081; A47J 43/27; C02F 1/002; C02F 1/34; C02F 1/36; C02F 1/72; C02F 1/722; C02F 2307/02; C02F 2103/007; C02F 2301/06; C02F 2301/063; C02F 2301/066; C02F 2303/04; C02F 2303/26; B01F 5/06; B01F 5/0602; B01F 5/0604; B01F 5/0608; B01F 11/0068; B01F 11/0081; B01F 11/0091
See application file for complete search history.

(56) References Cited

U.S. PATENT DOCUMENTS

| | | | | |
|---|---|---|---|---|
| 1,523,085 A | * | 1/1925 | Schramm | A47J 43/1081 366/269 |
| 2,181,612 A | * | 11/1939 | Smith | A47J 43/27 210/335 |
| 4,737,036 A | * | 4/1988 | Offermann | A47J 43/1081 366/130 |
| 2002/0193491 A1 | * | 12/2002 | Tachifuji | B01D 15/00 524/436 |
| 2011/0305103 A1 | | 12/2011 | McGuire et al. | |
| 2012/0055862 A1 | * | 3/2012 | Parekh | C02F 1/002 210/244 |

FOREIGN PATENT DOCUMENTS

JP       2011031231       2/2011

* cited by examiner

*Primary Examiner* — Lucas Stelling
(74) *Attorney, Agent, or Firm* — McHale & Slavin, P.A.

(57) ABSTRACT

A manually operated hydrodynamic cavitation water device formed from a cylindrical bottle having an internal chamber constructed and arranged to cause hydrodynamic cavitation of water placed within the bottle upon vigorous shaking. The bottle includes a series of plates positioned within the bottle having a plurality of bi-directional orifices designed to control the velocity of water with each said orifice. Each plate further includes a edge shape to induce shearing, which together with the plate orifices are constructed and arranged to create micro bubbles to create OH-radicals.

13 Claims, 3 Drawing Sheets

MANUAL HYDRODYNAMIC CAVITATION WATER TREATMENT DEVICE

PRIORITY CLAIM

In accordance with 37 C.F.R. 1.76, a claim of priority is included in an Application Data Sheet filed concurrently herewith. Accordingly, the present invention claims the priority date of U.S. Provisional Patent Application No. 61/755,679, entitled MANUAL HYDRODYNAMIC CAVITATION WATER TREATMENT DEVICE, filed Jan. 23, 2013, the contents of which are incorporated herein by reference in its entirety.

FIELD OF THE INVENTION

This invention is related to the field of potable water and in particular to a manual operated, bottle size, device for providing disinfection properties for drinking water.

BACKGROUND OF THE INVENTION

Due to the growing world population, freshwater sources including streams, rivers, springs and lakes are at risk of becoming polluted, or are polluted. According to current World Health Organization (WHO) estimates, approximately 3.4 million people die from water borne illnesses each year. Many of these illnesses are caused by Giardiasis, cryptosporidium and fecal coliform such as $E.$ $coli.$ According to a 2007 WHO report, 1.1 billion people lack access to an improved drinking water supply and 88 percent of the 4 billion annual cases of diarrheal disease are attributed to unsafe water and inadequate sanitation and hygiene. Disinfecting of water to remove or render inactive pathogenic organisms minimizes the epidemiological risk of a population by providing safe drinking water.

Larger population centers employ water plants that specialize in treating and monitoring source water for the surrounding population. Water treatment plants are expensive to build, require a large amount of space, and utilize conventional technology using costly chemical, mechanical and electrical devices. Unfortunately, despite all the safeguards, even water treatment plants may not successfully treat 100% of the water due to volume and distribution. For instance, it is not possible to maintain proper flow rates in all distribution lines. The building of a municipal water treatment plant requires forecasting that may or may not prove viable. Purified water can quickly become recontaminated if placed within stagnant lines. For this reason treatment plants typically use ozone or chlorine as a treatment step and attempt to maintain a residual within the distribution lines. Chlorine will kill disease-causing bacteria that the water or its transport pipes might contain. Unfortunately chlorine reacts with other naturally-occurring elements such as tannins to form toxins called trihalomethanes. Trihalomethanes have been linked to a wide range of human health maladies ranging from asthma and eczema to bladder cancer and heart disease. For this reason, chlorine is no longer used in very large doses so even large treatment plants can be distributing contaminated drinking water. Ozone is a highly effective treatment for bacteria but has minimal residual time.

In addition, while treatment plants service larger population centers, millions upon millions of people do not have access to professionally treated water. Such lack of access can be due to location such as a rural environment that may rely upon untreated spring or well water. Individuals who are remote from treated water, such as hiker, mountain bike riders, even soldiers need water but may not have access to treated water.

Early portable water disinfection options include boiling of the water, use of iodine tablets or chlorine tablets. As technology advances, more portable drinking water options have been developed which include advanced filtration techniques.

What is needed in the art is a device that allows for manually operated hydrodynamic cavitation to provide a portable treatment device for disinfecting water.

SUMMARY OF THE INVENTION

Disclosed is a manually operated hydrodynamic cavitation water treatment device formed from a cylindrical shaped housing having an internal chamber constructed and arranged to cause hydrodynamic cavitation to water placed within the housing when the housing is properly shaken. The housing includes a series of stages formed by circular shaped plates strategically positioned within the inner chamber of the housing. Each plate includes a plurality of orifices constructed and arranged to control the velocity of water passing through each of the orifices, the orifices having sharp edges to induce water shearing.

Essentially, the instant invention works when water is placed into the housing and the housing is properly shaken to create inertia during the process. The plates have sharp edges designed to chop bacteria flocs of colonies with water movement in either direction. Plate positioned orifices are used to create micro bubbles and the associated OH-radicals. All of the edges of the plate and orifices are sharpened to meet the requirements for destruction of biofilms. The result is a destruction of the bacteria load before consumer consumption of the drinking water.

An objective of the invention is to disclose a hydrodynamic cavitation water bottle that has no moving parts or expendable parts providing a simple and practical application for disinfecting drinking water.

An objective of the invention is to disclose a hydrodynamic cavitation water bottle formed from 100% BPA free plastic material, a material that is inexpensive, durable and readily available worldwide.

Another objective of the instant invention to provide a manual device capable of creating OH-radicals within the water.

Still a further objective of the instant invention is to create bacteria cell wall disruption in water.

It is yet another objective of the instant invention to place plates within a flow chamber at oblique angles in order to increase the number and intensity of the cavitations.

Other objectives and advantages of this invention will become apparent from the following description taken in conjunction with any accompanying drawings wherein are set forth, by way of illustration and example, certain embodiments of this invention. Any drawings contained herein constitute apart of this specification and include exemplary embodiments of the present invention and illustrate various objects and features thereof.

DETAILED DESCRIPTION OF THE PREFERRED EMBODIMENT

Figure 1:
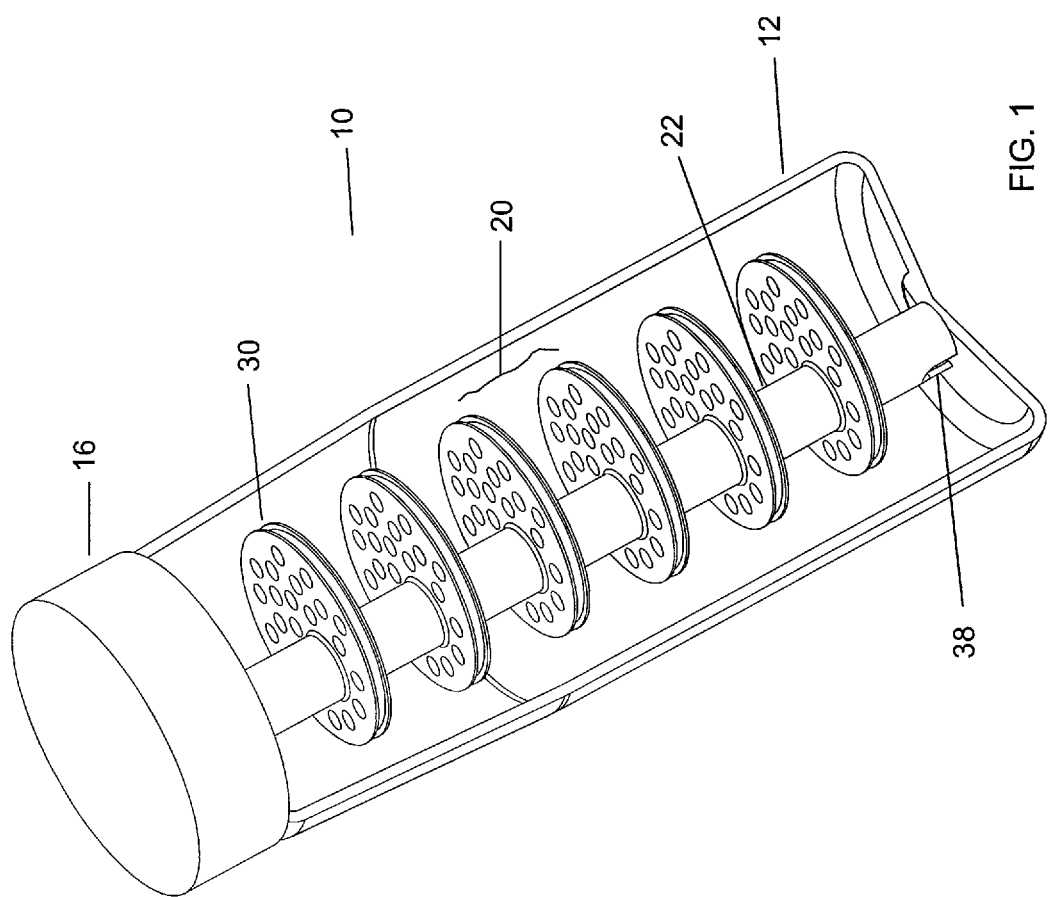
FIG. 1 is a cross sectional pictorial view of the hydrodynamic cavitation water treatment device of the instant invention.
Figure 2:
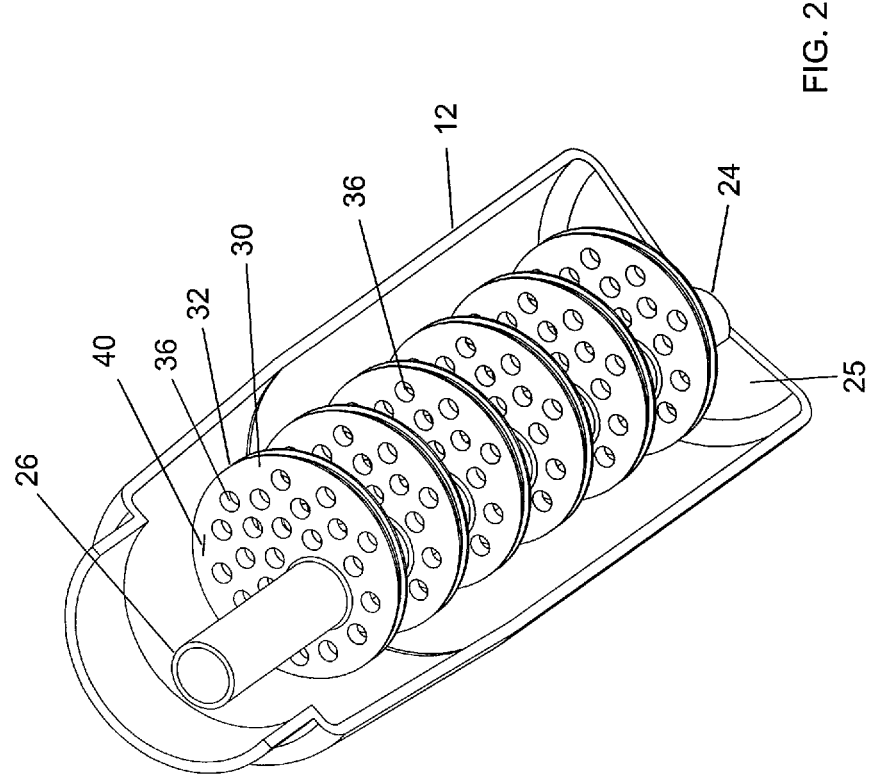
FIG. 2 is a sectional pictorial view thereof with the lid removed.
Figure 3:
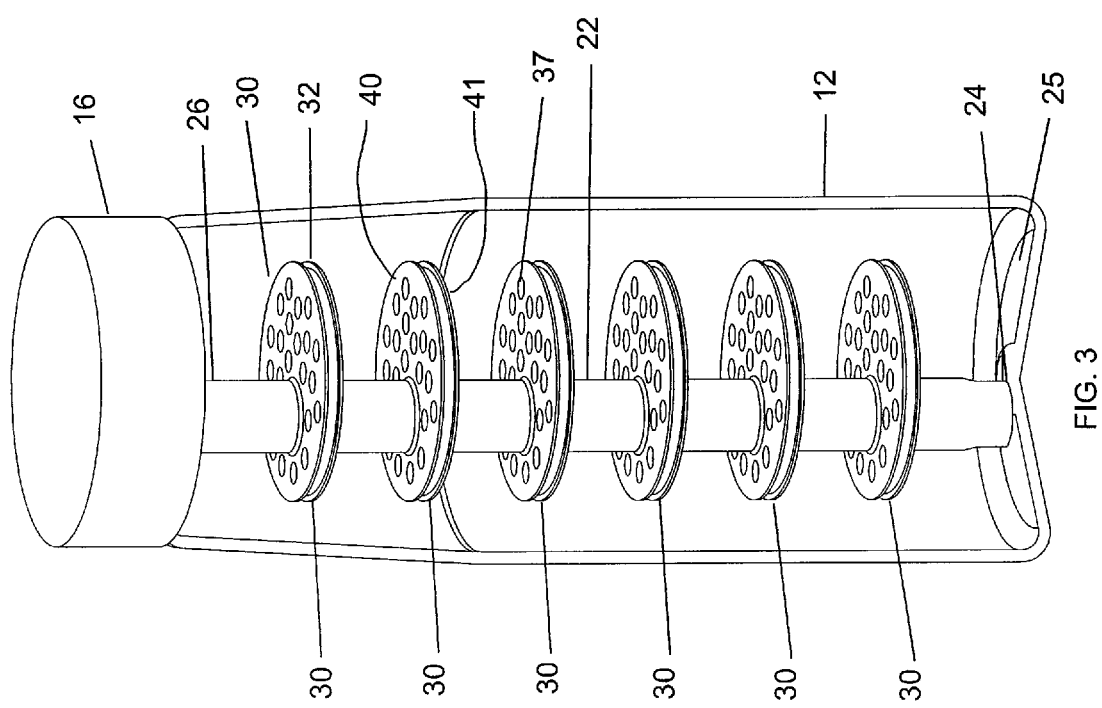
FIG. 3 is a sectional pictorial side view thereof.

A detailed embodiment of the instant invention is disclosed herein, however, it is to be understood that the disclosed embodiment using the defined dimensions is merely exemplary of the invention, which may be embodied in various forms and dimensions. Therefore, specific composition ranges disclosed herein are not to be interpreted as limiting, but merely as a basis for the claims and as a representation basis for teaching one skilled in the art to variously employ the present invention in virtually any appropriately detailed composition.

Now referring to the figures in general, the manual hydrodynamic cavitation water treatment device in the instant invention employs a housing 10 formed from a 0.75 L (25 ounce) bottle constructed from 100% BPA free plastic material. The housing 10 is further defined as a base member 12 having an inner chamber 14 and a top member 16 sealably securable to the base member 12. The top member 16 can be frictionally attached to the base member or secured by use of conventional threads.

A cavitation inducer assembly 20 constructed and arranged to cause hydrodynamic cavitation is positioned within the inner chamber 14. Hydrodynamic cavitation utilizes the hydrodynamic processes associated with a sudden change in flow geometry. The cavitation inducer assembly 20 comprises a support tube 22 having a first end 24 that extends to a lower surface 25 of the inner chamber 14 and a second end 26 that extends to the top member 16 when the top member 16 is secured to the base member 12. The cavitation inducer assembly 20 includes a plurality of plates 30 spaced annularly and secured to the support tube 22 with an outer edge 32 of each plate having a water shear inducing shaped edge. The shaped outer edge 32 is specifically designed for water shearing at a pre-calculated flow rate of water passing along the outer edge 32. In addition, each said plate 30 includes a plurality of orifices 36 having shaped edges constructed and arranged to cause water shearing as water is drawn past the orifices 36 in a pre-calculated rate based upon the displacement of water that occurs during a shaking action. The orifices 36 may also include differing water shearing edges to address lower flow positions between the plates 30.

Upon the placement of water into the housing and vigorous shaking thereof, the change in flow geometry results in a local drop in pressures thus inducing sonochemical reactions in the water with no other external energy or maintenance required. The initiation of cavitation is controlled by many different design parameters including size and shape of the cavitation inducer. It is important to note that for hydrodynamic cavitation device to operate, the cavitation inducer must include all of the design parameters in the form of edge and orifice shaping to cause a physiochemistry effect. The cavitation inducer assembly 20 being placed within housing 10 which assimilates a conventional water bottle in appearance for consumer appeal. The support tube 22 is hollow allowing treated water to be drawn from the first end 24 that extends to the lower surface 25. The first end 24 includes a side wall aperture 38 to allow fluid flow. The hollow support tube 22 allows uninhibited access to the lower area of the housing. The side wall aperture 38 allows water to enter the support tube for ease of removal by a straw or the like device.

The edge and orifice shaping is based upon a physiochemistry technique to create highly reactive hydroxyl (OH) radicals within the water while the container is shaken. Hydroxyl radicals have a high oxidation potential of 2.80V, which is higher than the most common disinfectants such as ozone (2.07 V) or chlorine (1.36 V). Hydrodynamic cavitation operates with a sudden change in flow geometry. The change in flow geometry results in a local drop in pressures thus inducing cavitation. Since, hydrodynamic cavitation is a physical process that induces sonochemical reactions (equations 1-8) in water, there is no external energy or maintenance required.

Inside the Bubble (T=5000 K, 500 bar).

$$H_2O_{(g)} \rightarrow OH_{(g)}^- + H_{(g)}^+ \quad \text{Eqn. 1}$$

$$O_2 \rightarrow O + O \quad \text{Eqn. 2}$$

$$O_2 + O \rightarrow O_a \quad \text{Eqn. 3}$$

$$P_{(g)} \rightarrow \text{Product} \quad \text{Eqn. 4}$$

(P: Pollutant)

$$OH_{(aq)}^- + P_{(aq)} \rightarrow \text{Product} \quad \text{Eqn. 5}$$

Boundary Phase: Gas-Liquid (T=2000K)

$$OH_{(aq)}^- + P_{(aq)} \rightarrow \text{Product} \quad \text{Eqn. 5}$$

$$P_{(aq)} \rightarrow \text{Product} \quad \text{Eqn. 6}$$

$$OH^- + OH^- \rightarrow H_2O_2 \quad \text{Eqn. 7}$$

Water Solution (T=300K)

$$OH_{(aq)}^- + P_{(aq)} \rightarrow \text{Product} \quad \text{Eqn. 5}$$

$$H_2O_2 + P_{(aq)} \rightarrow \text{Product} \quad \text{Eqn. 8}$$

Hydrodynamic cavitation takes place during the flow of water from the top member 16 to the lower surface 25 and back again by shaking the bottle in a format that causes water to flow through the predefined geometries, namely the orifices 36 and shaped edges 32 of the plates 30. The phenomenon results in the formation of hollow spaces which are filled with a vapor gas mixture in the interior of a fast-flowing liquid flow or at peripheral regions of a fixed body which is difficult for the water to flow around and the result is a local pressure drop caused by the liquid movement. At a particular velocity the pressure may fall below the vapor pressure of the liquid being pumped, thus causing partial vaporization of the cavitating water. During the reduction of pressure, gases which are liberated dissolve in the cavitating liquid. These gas bubbles also oscillate and thus give rise to the pressure and temperature pulses. The orifices 36 are arranged perpendicular to an upper surface of each plate. The orifices are sized to control the velocity of water flow with each orifice sized to provide a predetermined pressure drop for a volume of water flow. Each orifice is bidirectional and includes a shaped edge 37 along the upper surface 40 and lower surface 41 of each plate 30.

The manual hydrodynamic cavitation water treatment device of the instant invention eliminates the need for a pump to cause a high velocity flow, the shaking action creates the velocity necessary. The user of the manual hydrodynamic cavitation water treatment device will remove the top member 16 and dip the housing into a lake, stream or other source of suspect water. Sufficient space must be left in the housing to allow water flow movement. The top member 16 is then secured and the housing vigorously shaken to induce cavitation. The manual shaking of the device will cause the water to flow through the orifice holes to create thousands of localized hot spots, where cavitation occurs. These cavitation events will provide disinfection of the water by creating high reactive hydroxyl radicals (Eqn. 1), ozone (Eqn. 3) and hydrogen peroxide (Eqn. 7). Notably based on COMSOL Multiphyics 3.1 modeling, an estimated 34 chemical reactions are taking place during cavitation; in addition to hydroxyl radicals, ozone and hydrogen peroxide, hydroperoxyl radicals ($HO_2$) and superoxide ($O_2^-$) are also created during cavitation. The combination of all the oxidants produced during cavitation provides the means for disinfection. The housing can then be opened and the water available for consumption.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A manually operated hydrodynamic cavitation water treatment device comprising:
   a housing formed in the shape of a large mouth bottle defined by a base member having an inner chamber and a top member sealably securable to said base member;
   a fixed cavitation inducer assembly comprising a hollow support tube having a length extending from a bottom surface of said housing to said top member when said top member is secured to said base member;
   a plurality of plates secured to said support tube, each said plate having an outer sharpened edge constructed and arranged to induce a water shear when water is drawn past the outer sharpened edge at a high flow rate;
   a plurality of orifices having sharpened edges constructed and arranged to induce a water shear when water is drawn through said orifices at a high flow rate;
   wherein water placed within said bottle is shaken in a pattern to cause the creation of a hydrodynamic cavitation field through water shearing along said shear inducing edges and said orifices to produce hydroxyl radicals for disinfection of the water.

2. The water treatment device according to claim 1, wherein said orifices are arranged perpendicular to an upper surface of each said plate.

3. The water treatment device according to claim 1, wherein each said orifice is sized to control the velocity of water flow.

4. The water treatment device according to claim 1, wherein each said orifice is sized to provide a predetermined pressure drop for a volume of water flow.

5. The water treatment device according to claim 1, wherein each said orifice is bidirectional and includes a shaped edge along the upper surface and lower surface of each plate.

6. The water treatment device according to claim 1, wherein said base member and said top member are constructed from 100% BPA free plastic material.

7. The water treatment device according to claim 1, wherein said bottle holds 0.75 L of water.

8. The water treatment device according to claim 1 wherein said hollow support tube includes a side wall aperture formed along a lower end of support tube, said side wall aperture allowing water to flow into said support tube for ease of removal.

9. A manually operated hydrodynamic cavitation water treatment device comprising:
   a housing formed in the shape of a large mouth bottle defined by a base member having an inner chamber and a top member sealably securable to said base member;
   a fixed cavitation inducer assembly comprising a hollow support tube having a length extending from a bottom surface of said housing to said top member when said top member is secured to said base member;
   a plurality of plates secured to and placed perpendicular to said support tube, each said plate having an upper surface and an outer surface with a substantially circular and continuous sharpened outer edge constructed and arranged to induce a water shear when water is drawn past the outer edge at a high flow rate;
   a plurality of bidirectional orifices having a sharpened shaped edge along the upper surface and lower surface of each plate, each said orifice constructed and arranged to induce a water shear when water is drawn through said orifices at a velocity controlled flow rate;
   wherein water placed within said bottle is shaken in a pattern to cause the creation of a hydrodynamic cavitation field through water shearing along said shear inducing edges and said orifices to produce hydroxyl radicals for disinfection of the water.

10. The water treatment device according to claim 9, wherein each said orifice is sized to provide a predetermined pressure drop for a volume of water flow.

11. The water treatment device according to claim 9, wherein said base member and said top member are constructed from 100% BPA free plastic material.

12. The water treatment device according to claim 9, wherein said bottle holds 0.75 L of water.

13. The water treatment device according to claim 9 wherein said hollow support tube includes a side wall aperture formed along a lower end of support tube, said side wall aperture allowing water to flow into said support tube for ease of removal.

* * * * *